(12) United States Patent
Vermee et al.

(10) Patent No.: US 7,240,466 B2
(45) Date of Patent: Jul. 10, 2007

(54) DEVICE AND METHOD FOR PRODUCING TUBULAR PACKS THAT ARE FILLED WITH A PRODUCT

(75) Inventors: Frans Vermee, Remagen (DE); Leonid Larin, Moskau (RU)

(73) Assignee: Franz Vermee GmbH, Remegen (DE)

( * ) Notice: Subject to any disclaimer, the term of this patent is extended or adjusted under 35 U.S.C. 154(b) by 647 days.

(21) Appl. No.: 10/475,207

(22) PCT Filed: Apr. 20, 2002

(86) PCT No.: PCT/EP02/04369

§ 371 (c)(1),
(2), (4) Date: Apr. 5, 2004

(87) PCT Pub. No.: WO02/087974

PCT Pub. Date: Nov. 7, 2002

(65) Prior Publication Data

US 2004/0148909 A1    Aug. 5, 2004

(30) Foreign Application Priority Data

Apr. 27, 2001  (DE) ............................ 101 20 757

(51) Int. Cl.
B65B 51/05   (2006.01)
(52) U.S. Cl. .................. 53/417; 53/138.4; 29/243.56
(58) Field of Classification Search .............. 53/417, 53/138.4
See application file for complete search history.

(56) References Cited

U.S. PATENT DOCUMENTS

| | | | |
|---|---|---|---|
| 1,424,363 A * | 8/1922 | Leumann | 53/464 |
| 2,977,600 A * | 4/1961 | Ine et al. | 29/243.57 |
| 3,079,067 A | 2/1963 | Hill | |
| 3,587,204 A | 6/1971 | George | |
| 4,218,861 A * | 8/1980 | Marz | 53/138.4 |
| 4,339,940 A * | 7/1982 | MacKay et al. | 72/402 |
| 4,939,885 A | 7/1990 | Steinke | |
| 5,092,152 A * | 3/1992 | Miller et al. | 72/402 |
| 5,155,976 A * | 10/1992 | Okabe et al. | 53/527 |
| 5,918,447 A * | 7/1999 | Hanten et al. | 53/551 |
| 6,290,439 B1* | 9/2001 | Bludis et al. | 408/224 |
| 6,705,063 B1* | 3/2004 | Topfer et al. | 53/577 |
| 7,021,114 B2* | 4/2006 | Perreault | 72/402 |
| 7,143,625 B2* | 12/2006 | Edin | 72/402 |
| 2002/0138966 A1* | 10/2002 | Motsenbocker | 29/516 |

(Continued)

FOREIGN PATENT DOCUMENTS

CH        675947        11/1990

(Continued)

Primary Examiner—John Sipos
(74) Attorney, Agent, or Firm—Ohlandt, Greeley, Ruggiero & Perle L.L.P.

(57) ABSTRACT

A device for producing a tubular pack which is filled with a product, particularly with a foodstuff, comprises a conveying device for conveying a tube filled with the product. A closing device is provided for producing tubular packs. This closing device comprises pinching elements, which can be moved toward one another and which serve to press a closing clasp together that closes the tube. According to the invention, the closing device comprises at least three pinching elements that can be displaced by a displacing element. This results in the exertion of pinching forces, which are directed in a radially inward manner, by the pinching elements onto the closing clasp.

24 Claims, 5 Drawing Sheets

U.S. PATENT DOCUMENTS

2003/0192164 A1 * 10/2003 Austin .................. 29/505

FOREIGN PATENT DOCUMENTS

| | | |
|---|---|---|
| DE | 529045 | 6/1931 |
| DE | 1141216 | 12/1962 |
| DE | 1411489 | 4/1969 |
| DE | 4011470 | 10/1990 |

* cited by examiner

DEVICE AND METHOD FOR PRODUCING TUBULAR PACKS THAT ARE FILLED WITH A PRODUCT

FIELD OF THE INVENTION

The invention relates to a device for producing tubular packs which are filled with a product, particularly with a foodstuff and chemical products (silicones, adhesives, explosives). Such tubular packs are used, for example, for packing spreadable sausage and the like. Further, such tubular packs are suitable for packing chemical products, particularly silicones and adhesives, as well as for packing explosives.

DISCUSSION OF THE BACKGROUND ART

Conventionally, tubular packs are filled with the respective product and closed with a closing clasp of metal at regular intervals. The tubular pack is an endless material so that the closing clasps are arranged such that between two successive closing clasps, a tubular pack filled with a product and an empty tubular section are alternately configured. To produce a single tubular pack filled with a product, the tubular pack is separated by cutting in the empty section after it has been closed with closing clasps.

A device for producing tubular packs filled with a foodstuff is described in DE 40 11 470 A1. For closing the individual tubular packs, closing clasps consisting of a flat metal piece are used. The metal piece, which is rectangular in the non-deformed state, is laid about the filled tubular pack and closed by a closing device. By means of the closing device, the closing clasp is bent and pressed together from two sides so that a flat closing clasp is created. The ends of the closing clasp overlap each other to avoid that the product in the tubular pack escapes. Thus, the closing clasp known from DE 40 11 470 A1 is substantially rectangular in the closed state, the force required for closing being exerted upon the tubular pack by the two opposite longer sides.

Such closing clasps suffer from the disadvantage that tightness problems do often occur, particularly because of the ends of the closing clasps overlapping each other. This leads to the fact that the products do not keep well and the products have to be stored in refrigerating shelves. Another disadvantage consists in that the described device is only able to process closing clasps of a certain size. This results in that only tubular packs within a small diameter range can be processed. The processable dimensional variations are very small. Further, it is difficult to process different packaging materials if they differ in material thickness and thus, a different amount of material appears in the bundled state at that site where the closing clasp is arranged. This leads to tightness problems very often. To be able to process different tubular packs by this device, high modification efforts are required.

It is an object of the invention to provide a device for producing tubular packs that are filled with a product, by means of which different tubular packs can be closed. Further, it is an object of the invention to provide a corresponding method.

SUMMARY OF THE INVENTION

The object is solved, according to the invention, by a device according to claim 1 and a method according to claim 19.

The device for producing tubular packs filled with a product according to the invention comprises a conveying device for conveying a tube filled with a product, a closing device for closing the tube as well as preferably a cutting means for disconnecting individual or several interconnected tubular packs. The closing device comprises pinching elements which can be moved toward one another for pressing together a closing clasp that closes the tube. The individual closing clasps are preferably arranged such that a tubular pack filled with a product and an empty tube section alternate each other between closing clasps succeeding each other in conveyance direction. The separation of the tube filled with a product into individual tubular packs is then preferably effected by the cutting means, the cutting means separating the tube at the empty tube section. According to the invention, the closing device is configured such that at least three pinching elements are provided. The pinching elements are displaced by a displacing element in such a manner that they exert pinching forces onto the closing clasp which are substantially directed radially inward.

Due to the substantially radial displacement of the pinching elements, approximately uniformly and circumferentially distributed radial forces act on the tube in the region of the closing clasp. Thereby, a considerably greater tightness of the closure is ensured. This results in that the product in the tubular pack keeps much better. Thereby, it is also possible, in case of packed food, to keep it over an elongated period of time outside of refrigerating shelves.

Further, it is possible to set the substantially radial displacement of the pinching elements. Thereby, the circumference of the crimped closing clasp can be varied. To this end, in case of a closing clasp consisting of a metal wire, for example, it is only required to provide a piece of wire of corresponding length which is then formed into a triangle while using three pinching elements. Since the closing device according to the invention is able to simply realize different circumferences of the closing clasps in the crimped state, no labor-intensive modification of the closing device is necessary to be able to close, e.g., tubular packs with different outer diameters and thus with different material amounts to be closed. Differences in the package thickness, for which different closing clasps are necessary as well, can also be easily set and thus balanced by the device according to the invention.

By the use of three pinching elements, the closing device according to the invention produces a triangular closing clasp in the crimped state. Preferably, six and particularly preferably, eight pinching elements are provided. Thereby, a hexagonal or octagonal closing clamp is produced in the crimped state so that the tightness of the closing site is further increased. Due to the shape of the closing clasp approaching that of a round closure, it is further not required that the ends of the closing clasp overlap each other.

Each of the individual pinching elements may be connected with a displacing element by which a substantially radial movement of the pinching elements is realized. Preferably, the displacing elements are displaced by means of a common worm drive.

Preferably, the displacing element or several displacing elements are connected such with the pinching elements that the pinching elements are displaced in radial direction by moving or actuating the displacing element(s). It is particularly preferred to provide one or more displacing elements, the radial displacement of the pinching elements being caused by turning the displacing element(s). In this case, it is particularly preferred to provide a single, preferably annular, displacing element for all pinching elements. Preferably, the displacing element is connected with the pinching elements via pins or lugs and corresponding slots.

In a preferred embodiment, the closing device is configured in the manner of an iris diaphragm. In this case, the individual pinching elements are connected with the displacing element such that the pinching elements are displaced in substantially radial direction by rotating the displacing element. In the closing device configured in the manner of an iris diaphragm, the pinching elements are additionally rotated, if necessary. This is irrelevant with respect to the radially directed pinching forces. Upon closing the iris diaphragm, the closing clasp is bent and/or pressed together. Before the iris diaphragm is closed, the closing clasp may be a straight piece of wire, particularly flattened wire. Further, the closing clasp may already be pre-bent.

Preferably, the closing device in the manner of an iris diaphragm is constructed such that the displacing element to be rotated comprises lugs or slots and that each lug and slot, respectively, engages into a slot and lug provided in the transverse element, respectively. By rotating the closing element, the lugs glide in the slots. Thereby, the pinching elements are radially displaced. Thus, the opening of the iris diaphragm-like closing device depends on the degree of rotation of the displacing element. The farther the displacing element is rotated, the smaller is the opening of the iris diaphragm. This results in that the pinching forces linearly increase when the iris diaphragm opening gets smaller.

Preferably, the pinching elements are arranged in one plane. This has the advantage that a jamming or tilting of the closing clasp during the closing procedure is avoided.

Likewise, it is also possible to provide pinching elements in the shape of annulus segments or kidney-shaped pinching elements. Depending on the shape of the pinching elements, an approximately round deformation of the closing clasp can be effected. Thereby, a very tight sealing of the package is realized. Such pinching elements preferably overlap each other partially and therefore, they are arranged in different planes. Likewise, it is also possible to arrange the individual pinching elements so as to be slightly inclined towards each other so that an iris diaphragm-like closure is realized again and preferably, each single pinching element is in turn connected with a common rotatable displacing element again.

In a preferred embodiment of the device according to the invention, a severing means is provided. The severing means serves to sever the closing clasp, which is configured as an endless material, particularly as an endless wire. By means of the severing means, the endless material is cut into corresponding lengths. The length depends on the diameter of the tube filled with the product as well as on the material thickness of the tube. Preferably, the severance is effected so as to form a length where an overlapping of the ends of the closing clasp is avoided. Since it is known how far the pinching elements of the closing clasp are moved towards each other, i.e., how large the remaining opening is, the length of the closing clasps is preferably selected such that the two ends exactly contact each other when the closing clasp is crimped together. Thereby, an extremely tight sealing of the tubular pack is possible.

The length of the endless material to be severed may be set, e.g., by a stop. Further, it is possible to set the length to be severed due to the wire advance relative to a severance site of the severing means. In this case, the wire advance is effected preferably electrically.

In a particularly preferred embodiment, one of the pinching elements is configured as a severing means. To this end, the corresponding pinching element may comprise a cutting edge so that a severing of the endless material is effected preferably directly upon the radial displacement of the corresponding pinching element. The severing and subsequent pressing together of the closing clasp is thus preferably effected in one operational step.

Further, the invention relates to a method for producing tubular packs which are filled with a product, particularly with a foodstuff. The afore-described device is particularly well suitable for performing the method. During the method, a tubular pack filled with a product is supplied to a closing device. Preferably, this is a continuous conveyance of the tube filled with a product. Further, a closing clasp is supplied to the closing device with at least three pinching elements surrounding the tubular pack. In the next step, the pinching elements are displaced in substantially radial direction in such a manner that the pinching elements exert radial pinching forces upon the closing clasp. In the last step, successive tubular packs are then produced by separating the tubular pack between two closing clasps succeeding each other in the direction of conveyance.

Preferably, for closing the tubular pack, the pinching elements are substantially displaced in radial direction by rotating a displacing element connected with the pinching elements. It is also possible to provide several displacing elements to this end. It is preferred, however, to provide a single displacing element for all pinching elements so that all pinching elements are displaced, particularly radially inward in a uniform manner, by simply rotating a displacing element. Thereby, a uniform force is exerted upon the closing clasp.

Preferably, successive closing clasps are provided such at the tube that a tubular pack filled with a product and an empty tube section are alternately configured between two closing clasps succeeding each other in the direction of conveyance. Preferably, the tubular pack is separated between two closing clasps within the empty tube section.

It is particularly preferred to supply an endless material, particularly an endless wire, to the closing device and to sever the endless material to form the closing clasp. By using endless material as a closing clasp, an extremely variable method has been provided as to the circumference of the closing clasp in the crimped state, where this circumference can be changed in a simple manner.

With the method according to the invention, such a pinching force is generated that the packaging material bonds to itself in the region of the closing clasp. If the packaging material is plastic, a fusion of the packaging material can be achieved thereby. Thereby, the tightness of the tubular pack at the closing site is considerably improved. Particularly with plastic material, a completely tight bonding of the packaging material can be effected. This can be done exclusively by increasing the pinching forces. It is also possible to additionally supply the closing region with heat instead of increasing the pinching forces. To avoid an impairment of the food by the heat, it is possible to supply heat exclusively to the closing clasp itself if it consists of a heat-conducting material such as metal.

In dependence on the transport speed of the sausage tube, it is possible to move the closing device together with the tube in the direction of transport thereof during the pinching procedure. Thereby, a secure closing is achieved. Particularly if heat enters, a closing device moving along with the tube is advantageous. Preferably, the tube is transported in vertical direction. This has the advantage that the tube can be held so as to suspend freely within the closing device. In this case, the closing device is preferably arranged horizontally.

The fact that the closing device moves along with the tube has the advantage that a continuous transport of the tube filled with a product can be effected. Therefore, no "stop-and-go" operation for closing the tubular pack is required.

Hereinafter, the inventions are explained in detail with respect to a preferred embodiment with reference to the accompanying drawings.

DETAILED DESCRIPTION OF THE PREFERRED EMBODIMENT

Figure 1:
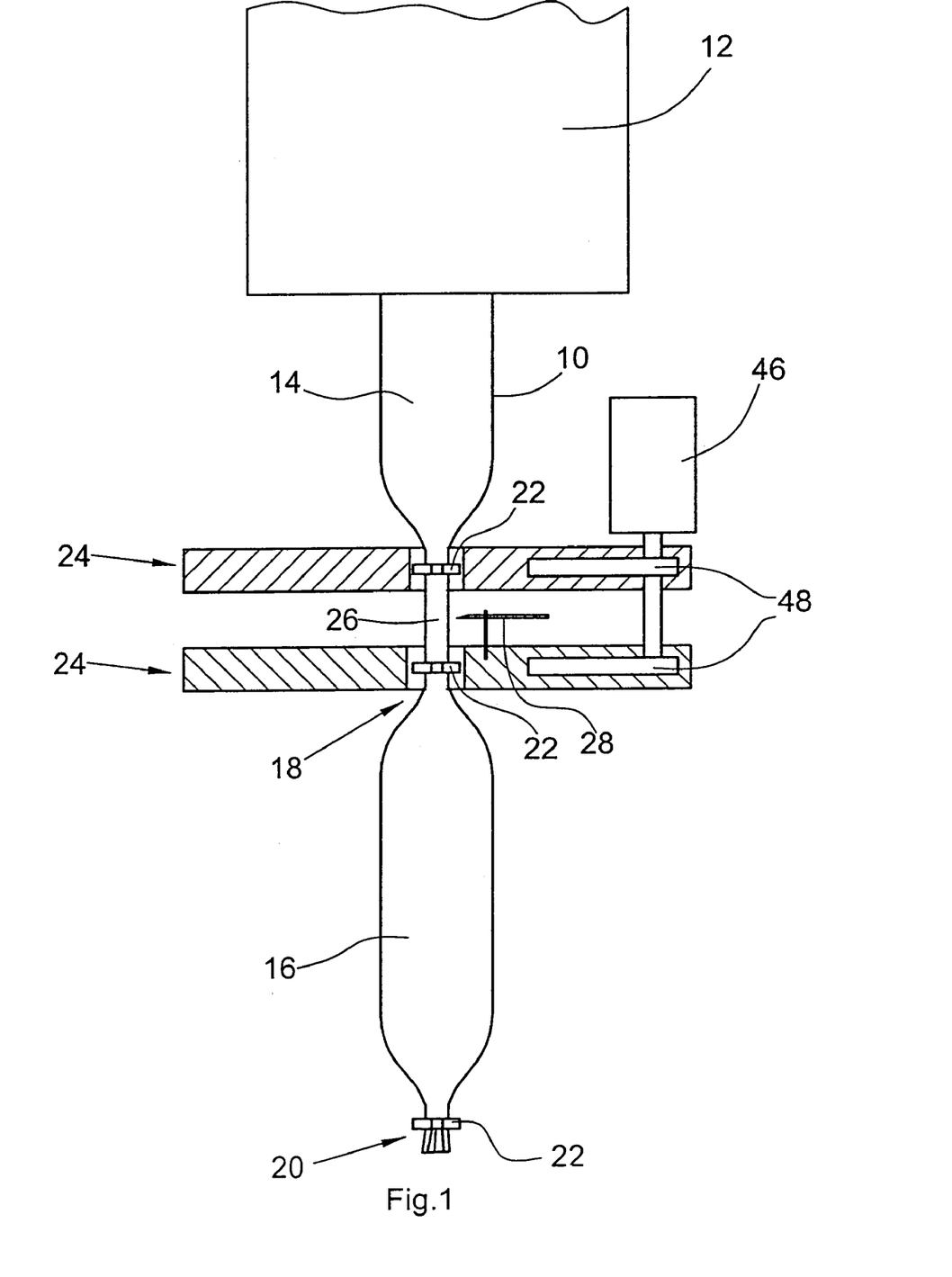
FIG. 1 shows a schematic, partially sectioned side view of the device according to the invention, FIGS. 2-5 schematic plan view onto the closing device in different positions, and FIG. 6 a schematic sectional view along the line VI—VI in FIG. 2.

Within a filling means 12, a tube 10 is filled with a product, particularly a foodstuff. Thereby, a well-filled tube 14 is produced which has to be divided into individual tubular packs 16. The ends 18, 20 of the tubular pack 16 are respectively closed by a closing clasp 22. In order to mount the closing clasps 22, two closing devices 24 are provided in the illustrated embodiment, which are arranged at a small horizontal mutual distance and tighten up the filled tube 14, crimp it and close it by means of the closing clasp.

Between the two closing devices 24, an empty tube section 26 or one at most slightly filled with a product is formed. At the empty tube section 26, the filled tube 14 is separated by means of a cutting means 28.

Figure 2:
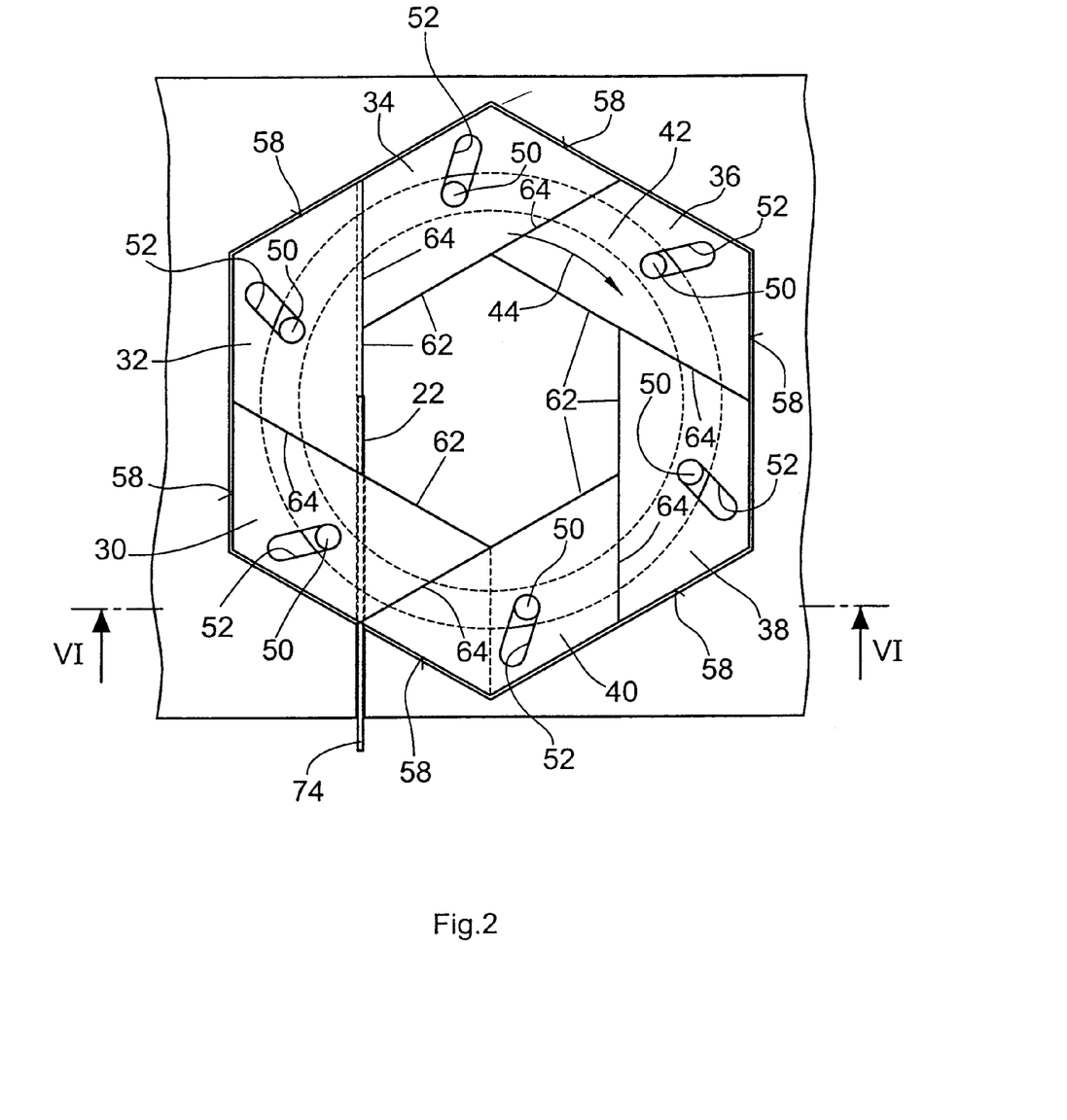

The closing device comprises several pinching elements 30, 33, 34, 36, 38, 40 (FIG. 2) which are displaceable via a displacing element 42. The displacing element 42 has to be rotated in the direction of an arrow 44 in order to displace the pinching elements 30-40. The drive of the two closing devices 24 illustrated in FIG. 1 and the displacing elements 42 provided therefor (FIG. 2) is effected via a motor 46 which, e.g., engages with the displacing elements 42 via gears 48 or the like. Likewise, a cam disc or the like may be provided for driving the displacing elements 42.

The movement of the pinching elements 30-40 can be seen in FIGS. 2-5. To this end, the substantially annular displacing element 42 comprises six pins 50 in the illustrated embodiment. The pins 50 are arranged at regular distances at the annular displacing element 42. Each pin or lug 50 protrudes into a slot 52, respectively. Each pinching element 30-40 comprises a slot 52. When the displacing element 42 is rotated in the direction of the arrow 44, the lugs or pins 50 glide into the slots 52. Thereby, the movements of the pinching elements 30-40 to be seen in FIGS. 2-5 are effected.

Figure 3:
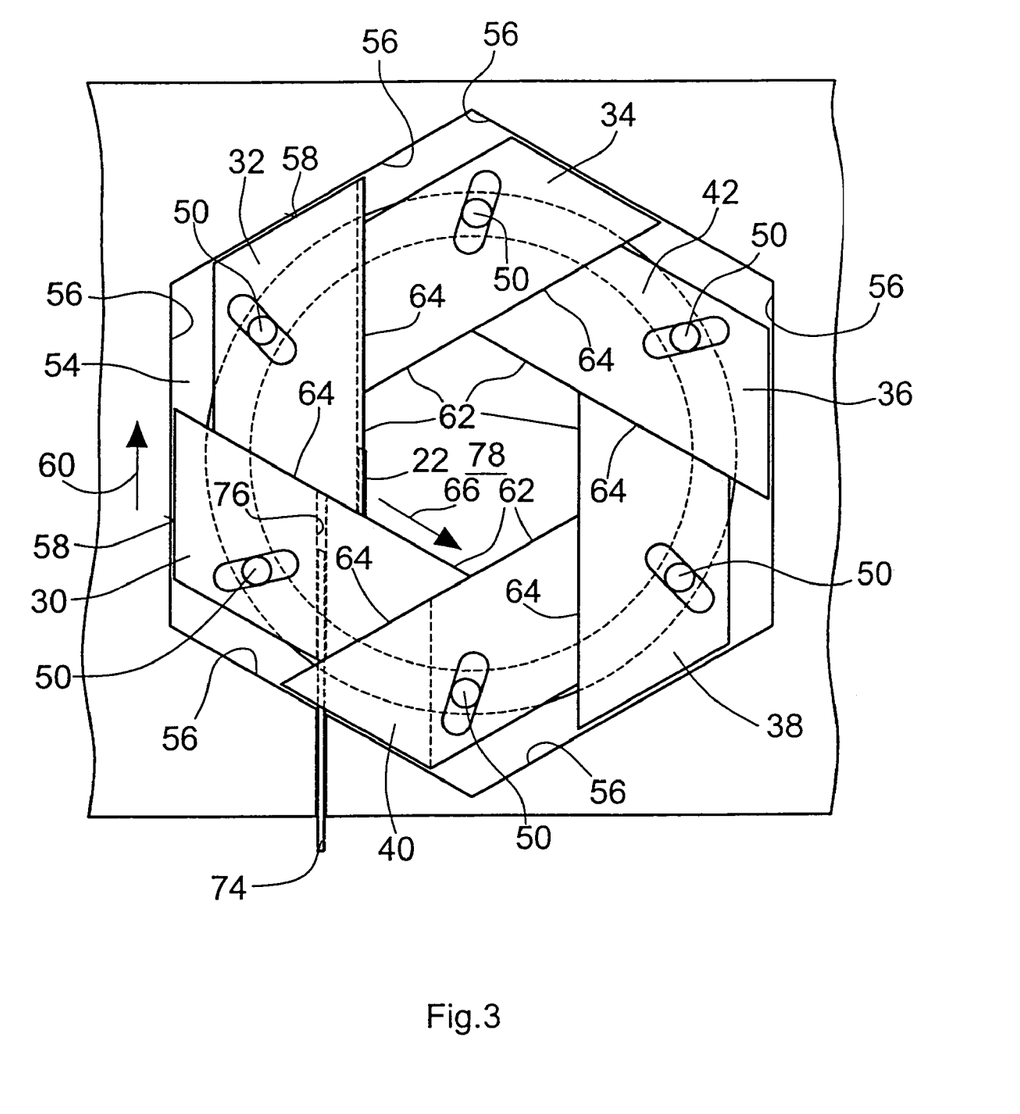
Figure 4:
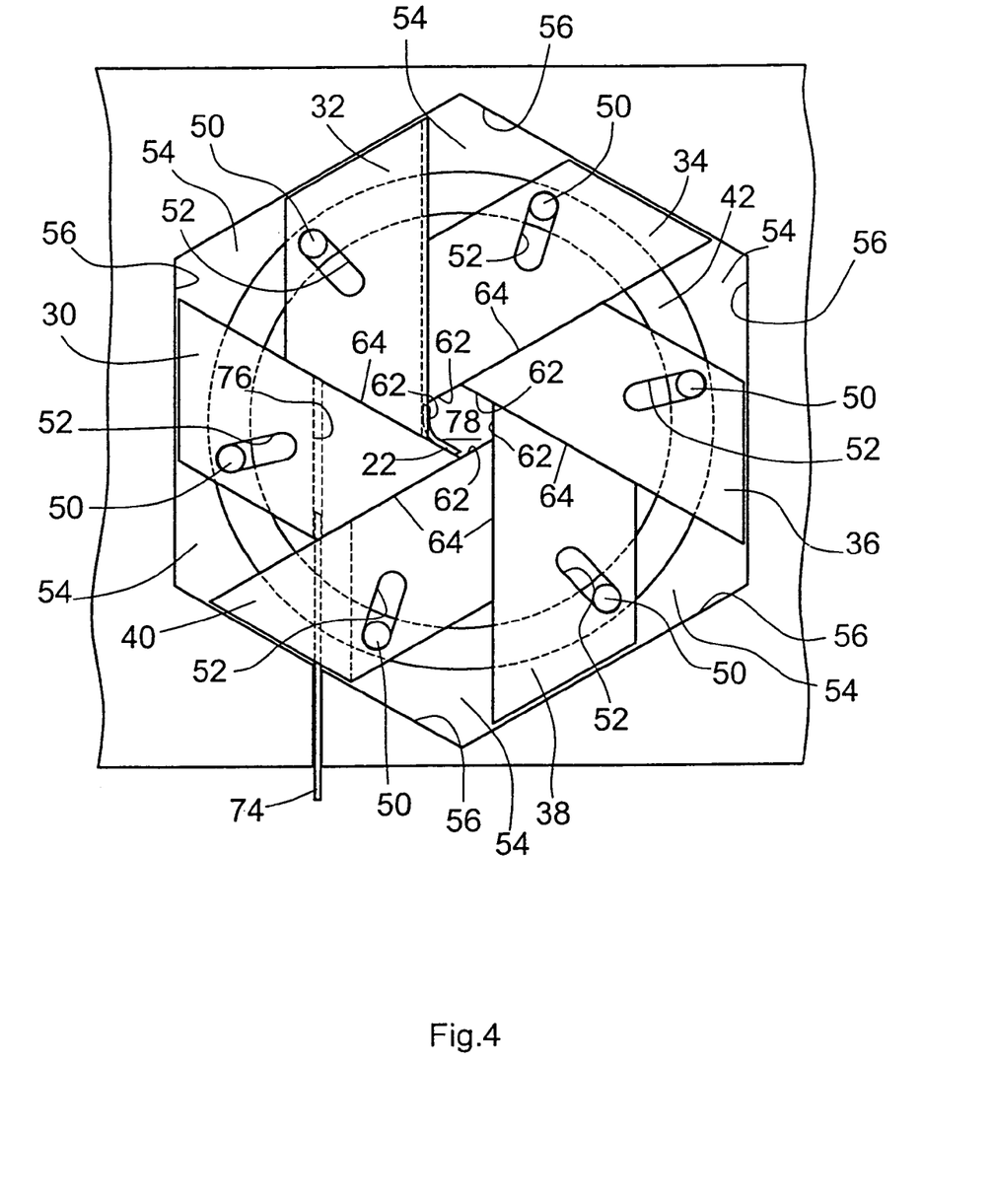

To avoid a co-rotation of the pinching elements 30-40 when the displacing element 42 is rotated, the pinching elements 30-40 are arranged in a hexagonal recess 54 in the illustrated embodiment. The hexagonal recess 54 comprises six inner edges 56, a narrow side 58 of the pinching elements 30-40 respectively contacting an inner edge 56. When the displacing element 42 is rotated in the direction of the arrow 44, the side faces 58 of the pinching elements 30-40 glide at the insides 56 of the opening 54 in the direction of an arrow 60 (FIG. 3).

Since the pinching elements 30-40 are arranged in a plane, neighboring pinching elements glide along narrow sides 62 and 64 contacting each other, respectively, when the displacing element 42 is rotated. With its narrow side 54, the pinching element 32, for example, glides along a long narrow side 62 of the pinching element 30 in the direction of an arrow 66. A corresponding movement is also performed between the other neighboring pinching elements 30-40.

Figure 6:
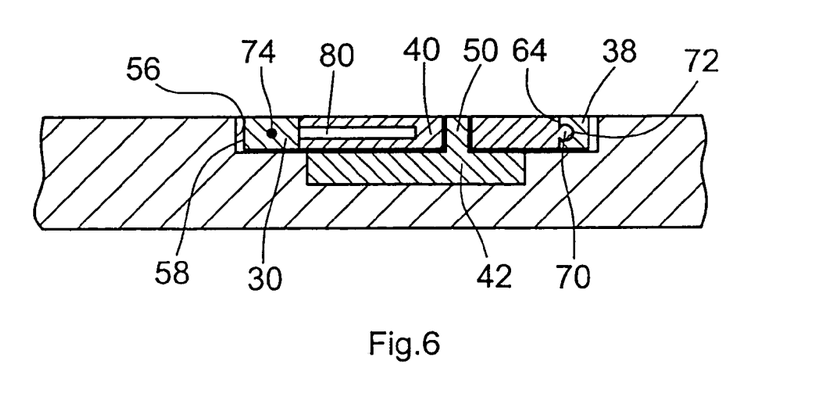

To avoid a jamming of the pinching elements 30-40, a narrow side 62 comprises a guiding projection 70 (FIG. 6). The guiding projection 70 engages into a guiding groove 72 provided in the narrow side 62 of the neighboring pinching element 38.

Figure 5:
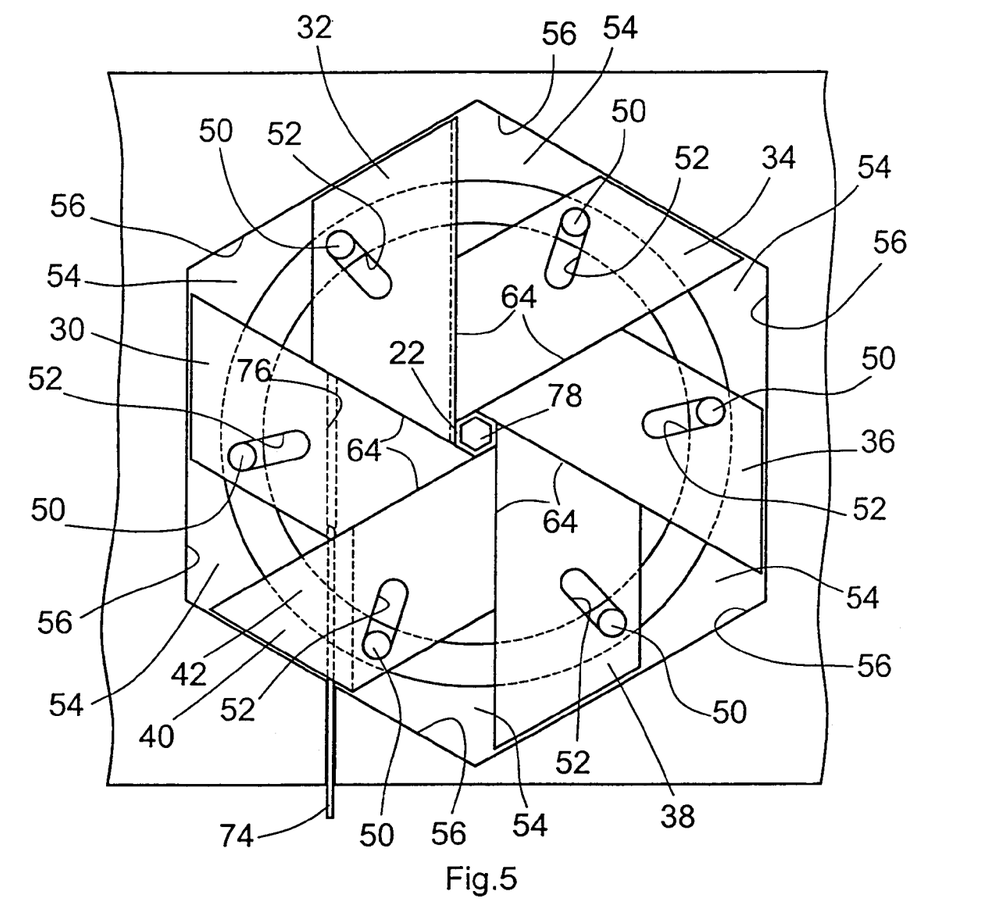

The closing clasp 22 consists of a bendable wire. Depending on the required length of the closing clasp 22, the latter is cut from an endless wire 74. The length of the closing clasp 22 depends on the required closing position (FIG. 5). The latter depends on the amount of tube material which is to be enclosed by the closing clasp. The metal wire 74 from which the closing clasp 22 is cut is led into the hexagonal interior space 78 formed by the six pinching elements 30-40 via a bore 76 provided in the pinching element 30. By a corresponding advance of the wire 74 or by a corresponding stop, the required length of the closing clasp 22 is determined. By moving the pinching element 32 in the direction of the arrow 66 (FIG. 3), the closing clasp 22 is cut off. To this end, the narrow side 62 of the pinching element 32 pointing in the direction of the opening 78 is configured as a cutting edge in the region where the cutting of the wire 74 is effected.

For not having to extract the wire 74 completely from the transverse bore 76 in order to permit a movement of the pinching elements for pinching the closing clasp, a slot 80 (FIG. 6) is provided in the pinching element 40 adjacent the pinching element 30, which serves to receive the wire 74 when the pinching elements 30-40 are displaced into the positions illustrated in FIGS. 2-5.

What is claimed is:

1. A device for producing tubular packs that are filled with a product, particularly with a foodstuff, comprising
   a conveying device for conveying a tube filled with the product, and
   a closing device for closing the tube, with pinching elements which can be moved toward one another for pressing a closing clasp together that closes the tube,
   wherein the closing device comprises at least three pinching elements that are displaceable by a displacing element in such a manner that the pinching elements exert radially inward directed pinching forces onto the closing clasp relative the tube center, and
   wherein each pinching element comprises a narrow side that glides in contact with a neighboring narrow side of a neighboring pinching element.

2. The device according to claim 1, wherein the pinching elements are arranged so as to be radially displaced.

3. The device according to claim 1 wherein the displacement of the pinching elements is effected by rotating the displacing element.

4. The device according to claims 1,
   wherein the closing device is configured in the manner of an iris diaphragm so that the pinching elements are displaced by rotating the displacing element.

5. The device according to claims 1,
   wherein the displacing element comprises lugs or slots, each lug and slot, respectively, engaging into a slot and lug, respectively, which are provided in each pinching element so that the lugs glide in the slots when the displacing element is actuated.

6. The device according to claims 1, further comprising a tubular pack filled with a product and an empty tube section are alternately formed between closing clasps succeeding each other in conveyance direction.

7. The device according to claim 6, further comprising a cutting means for separating the tube at the empty tube section.

8. The device according to claim 1, wherein the pinching elements are arranged in one plane.

9. The device according to claim 1, wherein said narrow side comprises a guiding groove into which a guiding projection of the neighboring narrow side engages.

10. The device according to claims 1, wherein the pinching elements have the shape of an annulus segment or are kidney-shaped.

11. The device according to claims 1, wherein the pinching elements are arranged in several planes parallel to each other.

12. The device according to claims 1, wherein the pinching elements are arranged such that the closing clasp is triangular or hexagonal in the crimped state.

13. The device according to claims 1, further comprising a severing means for severing the closing clasp supplied as endless material.

14. The device according to claim 13, wherein one of the pinching elements is configured as a severing means.

15. The device according to claim 13, wherein one of the pinching elements comprises a supply channel for supplying the endless material.

16. The device according to claims 6, further comprising two closing devices are arranged behind each other in conveyance direction in such a manner that the empty tube section is arranged between the two closing devices.

17. The device according to claim 7, wherein the cutting means is arranged between the two closing devices.

18. A method for producing tubular packs that are filled with a product, particularly a foodstuff, with the steps of supplying the tubular pack filled with a product to a closing device, supplying a closing clasp to at least three pinching elements of the closing device which surround the tubular pack, displacing each of the pinching elements in radial direction so that radial pinching forces are exerted onto the closing clasp by the pinching elements, by gliding each pinching element in contact with a neighboring pinching element, and separating the tubular pack between two closing clasps succeeding each other in conveyance direction.

19. The method according to claim 18, wherein the pinching elements are displaced by rotating a displacing element connected with the pinching elements.

20. The method according to claim 18, wherein a tubular pack filled with a product and an empty tube section are alternately formed between two closing clasps succeeding each other in conveyance direction.

21. The method according to claim 18, further comprising an endless material is supplied to the closing device and the endless material is severed to form the closing clasp.

22. The method according to claim 21, wherein the endless material is severed in dependence on the circumference of the closing clasp in the crimped state.

23. The method according to claim 22, wherein the endless material is severed such that the ends of the closing clasp do not overlap each other in the crimped state.

24. The method according to claim 18, wherein such a pinching force is generated that the packaging material bonds to itself.

* * * * *